United States Patent [19]

Jesurum et al.

[11] Patent Number: 5,430,792
[45] Date of Patent: Jul. 4, 1995

[54] AUTOMATED TELEPHONE CALLING SYSTEM

[75] Inventors: Robert Jesurum, Rye, N.H.; David A. Jamroga, Stamford; Paul E. Zmuda, Stratford, both of Conn.

[73] Assignee: Electronic Information Systems, Inc., Stamford, Conn.

[21] Appl. No.: 218,869

[22] Filed: Mar. 28, 1994

Related U.S. Application Data

[63] Continuation of Ser. No. 695,350, May 3, 1991, abandoned.

[51] Int. Cl.$^6$ .................. H04M 1/64; H04M 3/00
[52] U.S. Cl. ........................ 379/67; 379/88; 379/92; 379/265; 379/266; 379/309; 379/377
[58] Field of Search .................. 379/67, 88, 89, 92, 379/69, 266, 377, 309, 265

[56] References Cited

U.S. PATENT DOCUMENTS

| | | | |
|---|---|---|---|
| 3,989,899 | 11/1976 | Norwich | 379/134 |
| 4,477,698 | 10/1984 | Szlam et al. | 379/377 |
| 4,540,855 | 9/1985 | Szlam et al. | 379/377 |
| 4,599,493 | 7/1986 | Cave | 379/247 |
| 4,600,814 | 7/1986 | Cunniff et al. | 379/356 |
| 4,742,537 | 5/1988 | Jesurum | 379/351 |
| 4,797,911 | 1/1989 | Szlam et al. | 379/92 |
| 4,894,857 | 1/1990 | Szlam et al. | 379/67 |
| 4,941,168 | 7/1990 | Kelly, Jr. | 379/92 |

*Primary Examiner*—James L. Dwyer
*Assistant Examiner*—Fan Tsang
*Attorney, Agent, or Firm*—Pennie & Edmonds

[57] ABSTRACT

An automatic telephone calling system that characterizes the responses from telephone subscribers' telephone stations to placed calls from the system. The system comprises communication lines which enable the system to place a call to a subscriber's station, to receive the response thereto, and exchange information therebetween. Operator stations enable operators of the calling system to communicate, via a respective communication line, with a subscriber's station upon an operable connection of the line to the subscriber's station and to the operator station. A call processor places calls to subscribers' stations and operably connects and disconnects each communication line to a respective subscriber's station and to a respective operator station. A trunk processor characterizes the response from a respective subscriber's station to a placed call and determines whether a response characterized as a voice signal is delivered by an answering machine. The system also has a call manager that controls the availability of each operator station to be operably connected to a communication line by the call processor. In operation, the call processor operably connects a communication line to a respective subscriber's station upon a characterization of the response on the line as a voice signal, operably connects the line to an available operator station upon a determination by the trunk processor, and disconnects the line to the subscriber's station and to the operator station upon a determination that the response characterized as a voice signal is delivered by an answering machine.

57 Claims, 5 Drawing Sheets

Legend: TP-Trunk Processor
CM- Call Manager
CP- Call Processor

Legend: TP-Trunk Processor
CM-Call Manager
CP-Call Processor

AUTOMATED TELEPHONE CALLING SYSTEM

This is a continuation of application Ser. No. 07/695,350, filed May 3, 1991, now abandoned.

TECHNICAL FIELD

The invention relates generally to a telephone calling system. In particular, the invention relates to an automated telephone calling system which detects a call pickup by an answering machine.

BACKGROUND OF THE INVENTION

Various methodologies have been developed to automatically determine when a machine-placed telephone call made to a telephone subscriber, such as is done by a telemarketing computer calling system, has been answered. Such determinations must be made within a very short time frame, almost instantaneously, so that a calling system can reduce productivity losses and, by connecting a waiting operator to the subscriber without any perceivable delay, increase performance quality.

The more preferable methodologies are based on techniques which detect the voice of an answering subscriber. However, many of the telephone line monitoring sub-systems of present calling systems that implement such techniques cannot detect voice in a sufficiently fast manner. An example of a monitoring sub-system which requires relatively long sampling periods of the input signal is described in U.S. Pat. No. 4,356,348. More advanced techniques, and monitoring sub-systems, have been developed recently which can detect the voice of an answering subscriber almost instantaneously and in a reliable and inexpensive manner. Such a telephone line monitoring sub-system is described in U.S. Pat. No. 4,742,537.

With the growing use of automatic answering machines by subscribers, it also has now become desirable to have a calling system which can determine when a call has been answered by a subscriber or by an answering machine. Upon a determination that a call has been answered by an answering machine, such a calling system could then undertake an alternative action, for example, not connect a waiting operator to the telephone line. If not required to complete the call, the calling system operator can then use the saved time to handle other answered calls that are received by the calling system during a telephone calling campaign.

Ironically, although many present calling systems are slow in detecting and responding to human voice, they are fast enough in detecting and responding to answering machines. For instance, such systems may take advantage of their slow voice detection and further wait to detect whether a voice continues speaking without a long break (such as would normally occur after a subscriber answers a call by saying "hello"), thus indicating a prerecorded message from an answering machine. Clearly, imitation of such a methodology by a system which provides instantaneous voice detection would eliminate the advantage such a system holds with respect to detecting and responding to subscribers. In fact, the loss of productivity of a few seconds in the handling of each call by an "instantaneous voice detection" calling system using such a methodology becomes a net loss for an entire telephone calling campaign by the calling system, even with improved detection and response to answering machines. In addition, the natural start of conversations provided by "instantaneous voice detection" calling systems would be lost. Consequently, there is a need to develop a system and methodology that will detect and respond to answering machines in an efficient, reliable and inexpensive manner while conserving the advantage of an "instantaneous voice detection" calling system.

SUMMARY OF THE INVENTION

Briefly, the invention provides an automatic telephone calling system having means for placing the call to the subscriber's telephone station and receiving the response thereto and means for characterizing the response from the subscriber's telephone station to the placed call. The system also has means for operably connecting the calling system to the subscriber's telephone station upon a characterization of the response as a voice signal; means for determining whether the response characterized as a voice signal is delivered by an answering machine; and means for terminating the operable connection upon a determination by the means for determining that the response is delivered by an answering machine.

The means for characterizing can include means for detecting the occurrence of each waveform composing the response signal; means for measuring the wavelength of each waveform detected; means for counting the number of waveforms within each of a plurality of predetermined wavelength groupings; and means for characterizing the response based on the counts of waveforms within the plurality of predetermined wavelength groupings and the distribution thereof. The means for characterizing can also include, alternatively, means for detecting a particular polarity change of the voltage of the response signal over a selected interval; means for measuring the wavelength of each waveform composing the response signal between each polarity change detected; means for counting the number of waveforms composing the response signal within each of a plurality of predetermined wavelength groupings; and means for processing the frequency-related information of the response signal from the means for detecting, the means for measuring, and the means for counting to determine the characterization of the response.

The means for operably connecting can include means for partially operably connecting the calling system to the subscriber's telephone station upon a characterization of the response as a voice signal and means for completing an operable connection of the calling system to the subscriber's telephone station upon a determination by the means for determining. The means for operably connecting can also include, alternatively, means for establishing two-way audio communication between the system and the subscriber's telephone station.

The means for determining can include means for detecting a predetermined period of silence from the end of the response from the subscriber's telephone station in order to determine whether a response characterized as a voice signal is delivered by an answering machine.

The means for terminating can include means for delivering a prerecorded message to the subscriber's telephone station, via the means for placing, before terminating the operable connection. Further, the system can also include means for overriding the operation of the means for terminating and maintaining an operable connection of the calling system to the subscriber's telephone station.

BRIEF DESCRIPTION OF THE DRAWINGS

For a better understanding of the invention, reference is made to the following description of an exemplary embodiment thereof, and to the accompanying drawings, wherein.

DETAILED DESCRIPTION

Figure 1:
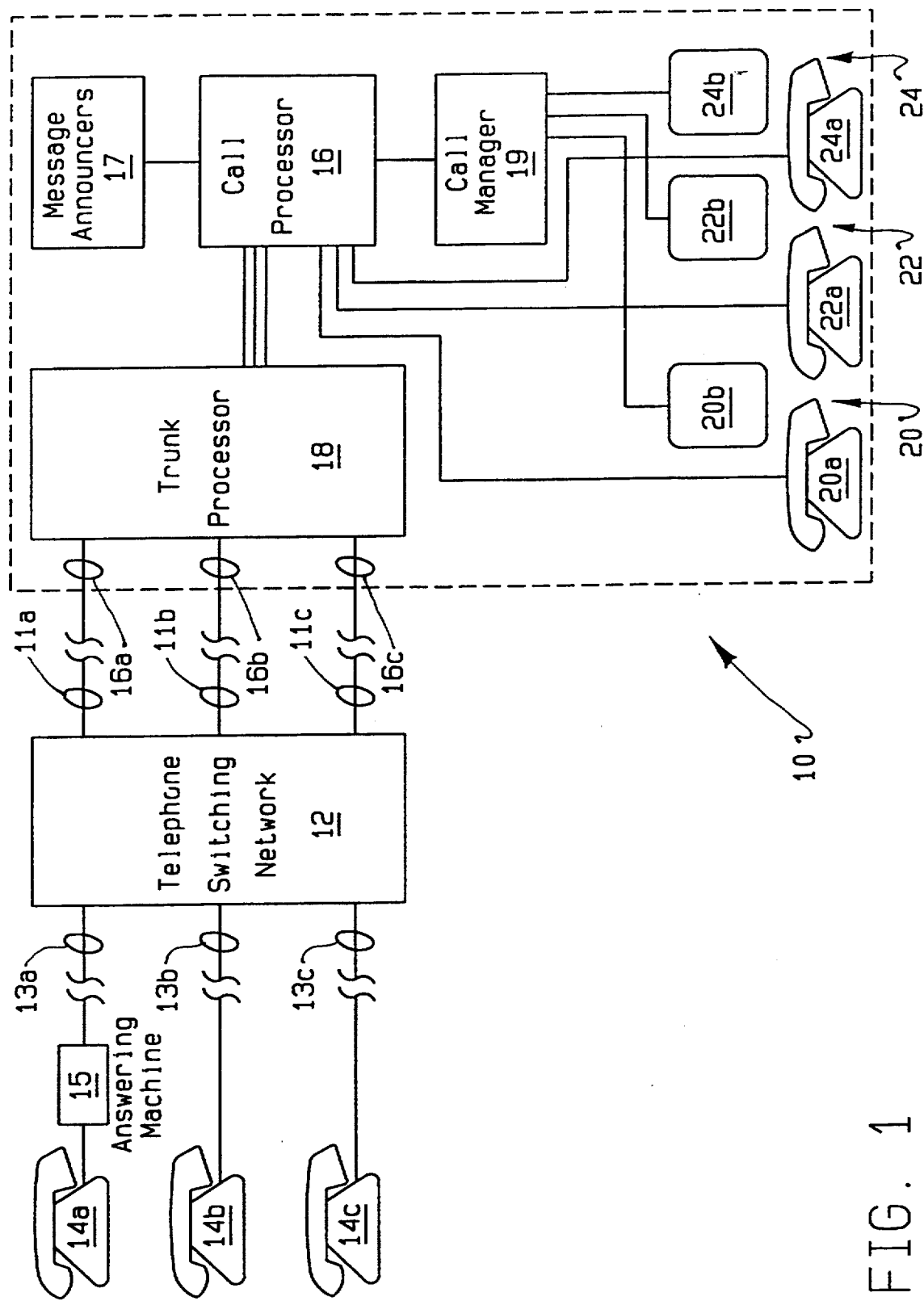
FIG. 1 is a block diagram of an automated telephone calling system constructed in accordance with the present invention.

FIG. 1 is a block diagram of an automated telephone calling system 10, such as a telemarketing computer calling system, constructed in accordance with the present invention. The calling system 10 is connected by telephone lines 11a, 11b, 11c to a telephone switching network 12, as usually provided by the local telephone company and associated long distance telephone companies. The telephone switching network 12, in turn, is connected by respective telephone lines 13a, 13b, 13c to a plurality of subscriber telephone sets 14a, 14b, 14c. As shown, an automatic answering machine 15 is connected in-line with one of the sets 14a (although other types of connections therebetween are possible) so as to form a bridge between the set 14a and the respective telephone line 13a. The answering machine 15 may be a device of any type, model or brand and may include "voice mail" services and the like (i.e., telephone answering services provided via software, usually by various telephone system vendors, that function as an answering machine equivalent without any device being physically present at a subscriber location). Subscriber's equipment, such as subscriber set 14 and the answering machine 15, is also referred to as subscriber's telephone station.

Figure 2A:
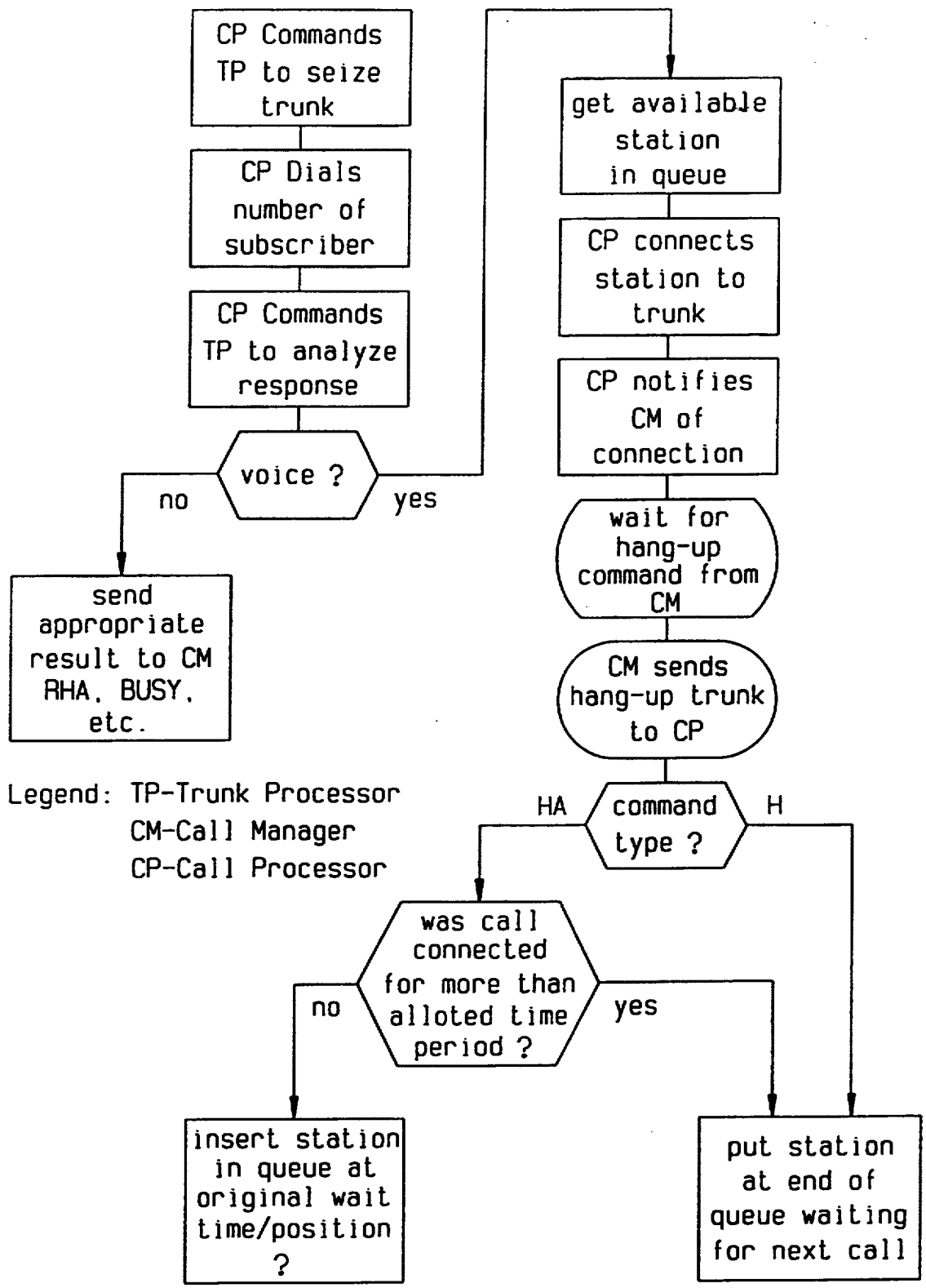
FIG. 2a is a flow chart of a software program used by the calling system of FIG. 1 formatted without the option of answering machine detection.
Figure 2B:
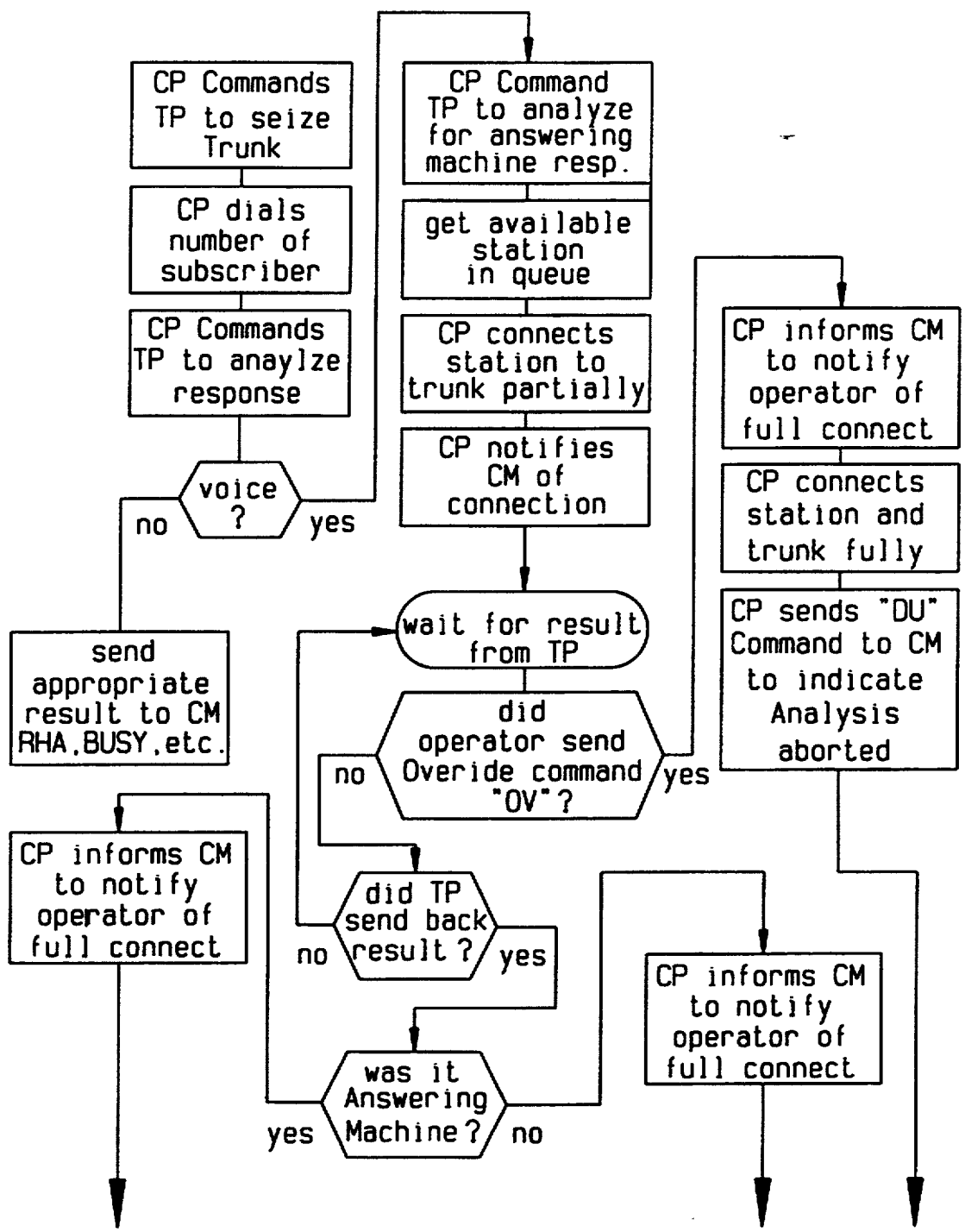
FIG. 2b is a flow chart of a software program used by the calling system of FIG. 1 formatted with the option of answering machine detection.
Figure 2B:
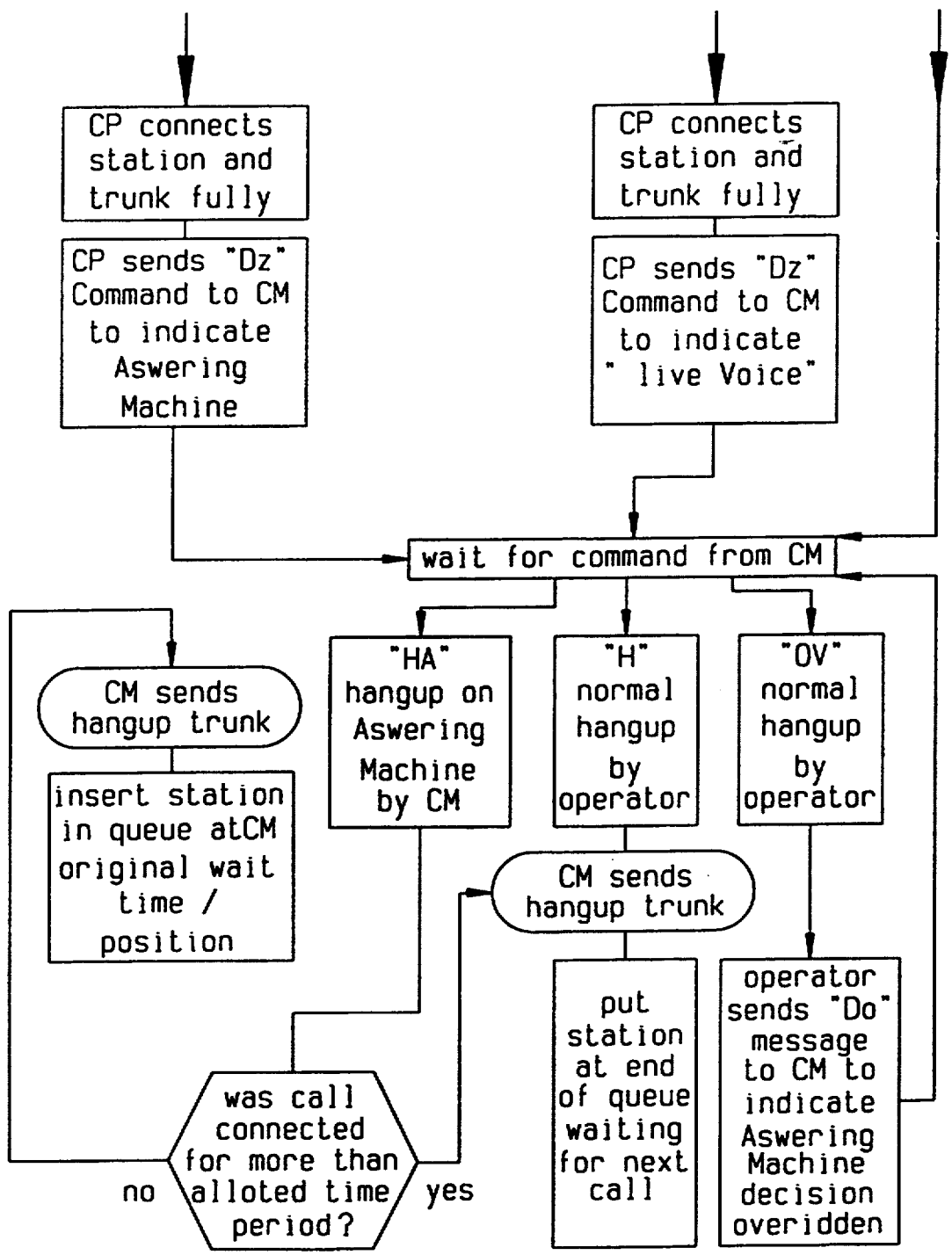

The calling system 10 comprises a call processor 16 which switches each of a plurality of trunks 16a, 16b, 16c to connect to a respective telephone line 11a, 11b, 11c between the calling system 10 and the telephone network 12 in order to place outgoing calls to the subscriber sets 14a, 14b, 14c and to receive responses or incoming calls from the subscriber sets 14a, 14b, 14c. The call processor 16 thus functions as the dialer and traffic controller for the system 10. A plurality of message announcers 17 are operably connected to, and which may form part of, the call processor 16. As detailed below, the message announcers 17 are actuated by the operation of the call processor 16 to deliver prerecorded messages that are to be received and recorded by an answering machine 15 connected to a subscriber set 14a. The calling system 10 also comprises a trunk processor 18 which is operably connected to, and which may form part of, the call processor 16 and which monitors the condition of each trunk 16a, 16b, 16c connected to a respective telephone line 11a, 11b, 11c. The calling system 10 further comprises a call manager 19 which is connected to the call processor 16 and which oversees the operation of a plurality of operator stations 20, 22, 24. Each operator station 20, 22, 24 comprises a voice terminal 20a, 22a, 24a, i.e., a telephone set, which is connected via a respective voice path to the call processor 16 and a data terminal 20b, 22b, 24b (having an appropriate input/output device, such as a video display) which is connected via a respective data path to the call manager 19. Each operator station 20, 22, 24 is a communication device between a human operator (not shown) and the call manager 19, whereby the operator can send and receive information to and from the calling system 10, and, ultimately, between the human operator and a connected subscriber set 14a, 14b, 14c. One or more of the operator stations 20, 22, 24 may be a supervisory station that performs various functions for the calling system 10, such as, setting up the format of the operation of the calling system 10, implementing any changes to the format, and monitoring any of the other operator stations 20, 22, 24. The calling system 10 relies on either a central logic element, individual logic elements within each system component, or a combination of the two to control the overall operation of the calling system 10 and the exchange of information (e.g., messages, instructions, etc.) among the various components. FIGS. 2a and 2b show flowcharts for a software program that is used by the logic elements of the calling system 10.

The calling system 10 can utilize either analog or digital transmission technology, or a combination of both. Further, the system 10 can easily accommodate the appropriate interfaces and network terminations (not shown) required to link into an integrated-services digital network (ISDN) or the like. In such an ISDN environment, the calling system 10 components, or their ISDN equivalents, will act in similar fashion as described herein. Thus, for example, instead of switching the plurality of trunks 16a, 16b, 16c (and associated telephone lines 11a, 11b, 11c), the call processor 16 may switch the equivalent ISDN elements, i.e., the plurality of B channels and the D channel, via an ISDN interface. Notably, the performance of the calling system 10, particularly the instantaneous voice detection elements and the improved answering machine detection elements, will be enhanced in an ISDN environment since control information and voice/data information of a communication are on separate channels and may be routed directly to the appropriate system 10 components. This can result in the calling system 10 operating more quickly and more accurately and can reduce the cost of the system 10 by eliminating certain coding and switching circuitry and replacing hardware and software, for example, for detecting special information tones.

Before operation of the calling system 10, a human operator at a supervisory station will format the operation of the calling system 10 for the particular campaign of telephone calling. The format includes the establishment of the various parameters of the calling campaign, for example, the particular queue of the operator stations 20, 22, 24 in being connected to answered telephone calls. The format also includes the selection of various system 10 options, including for example, the option of detecting and responding to an answering machine 15 at a subscriber location, the option of delivering a prerecorded message to an answering machine 15, and the option of having a supervisory station monitor the individual stations 20, 22, 24 and validate a station's selection of any override options. The format, including the selected options, are then stored for subsequent implementation by the various calling system 10 components.

FIG. 2a is a flow chart of a software program used by the calling system 10 formatted without the selection of the option of detecting and responding to an answering machine 15 at a subscriber location. In operation, the call processor 16 commands the trunk processor 18 to seize one of the available trunk lines 16a and then dials the telephone number of a subscriber to place an outgoing call via the trunk line 16a and the respective telephone line 11a to which it will be connected. The telephone network 12 routes the outgoing call from the telephone line 11a to the subscriber telephone set 14a via the respective subscriber telephone line 13a. The call processor 16 commands detection circuitry of the trunk processor 18 to monitor the particular active trunk 16a for a connection to the respective subscriber telephone set 14a, i.e., a pick-up of the telephone set 14a and analysis circuitry of the trunk processor 18 to determine, via the use of voice detection software, whether the response from the telephone set 14a is voice or telephone tone. In an "instantaneous voice detection" system, as described in U.S. Pat. No. 4,742,537, (which disclosure is incorporated by reference into the present specification) this determination is typically accomplished within twenty milliseconds. Note that the response may be in analog or digital form and that the calling system 10 can process either type of response or both. Further, depending upon the application, the calling system 10 can be configured to convert one form into another before processing the response.

If it is determined that the response is voice, the analysis circuitry of the trunk processor 18 sends a "voice detect" signal to the call processor 16 which then connects the output of the active trunk 16a to the next available operator station 20 in the station queue and connects back the output of the particular operator station 20, i.e., completes the station side of the connection. This establishes a voice path (i.e., two-way audio communication) between the voice terminal 20a of the operator station 20 and the subscriber set 14a. The call processor 16 also notifies the call manager 19 of the completed connection. In turn, the call manager 19 notifies the operator, by flashing a message onto the display of the data terminal 20b of the operator station 20, that an outgoing call has been answered and, since the answering machine detection option was not selected during the formatting of the system 10, that the answering machine option was not selected. Normal operation continues as a particular video display may then be generated for operator use and the operator may, for example, then talk to a subscriber if actually present on the telephone line 11a, verbally leave a message on the answering machine 15, or take information regarding the dialed telephone number from a telephone company intercept message. Upon completion of the operation, the operator sends a command, via the data terminal 20b, to the call manager 19 to send a hang-up signal, an "H" signal, to the call processor 16 to hang up the telephone line 11a by terminating the connection between the active trunk 16a and the respective telephone line 11a and to place the operator station 20 at the end of the station queue. In addition, the operator may select the option of forcing the sending of a special hang-up signal, an "HA" signal, to the call processor 16 as detailed below.

If it is determined that the response is not voice, i.e., a telephone tone, the analysis circuitry of the trunk processor 18 signals the disposition to the call processor 16 which terminates the call by disconnecting the active trunk 16a from the telephone line 11a, enabling the call processor 16 to re-utilize the trunk line 16a for a new call. Note that the system 10 can be configured to distinguish between various telephone tones, such as special information tones, each of which will actuate a different action. If so configured, the call manager 19 will pass the formatting information regarding how to treat the different responses to the call processor 16. Thus, for example, the call manager 19 will make decisions about redialing and will pass each redial request, at the appropriate time, to the call processor 16.

Figure 3:
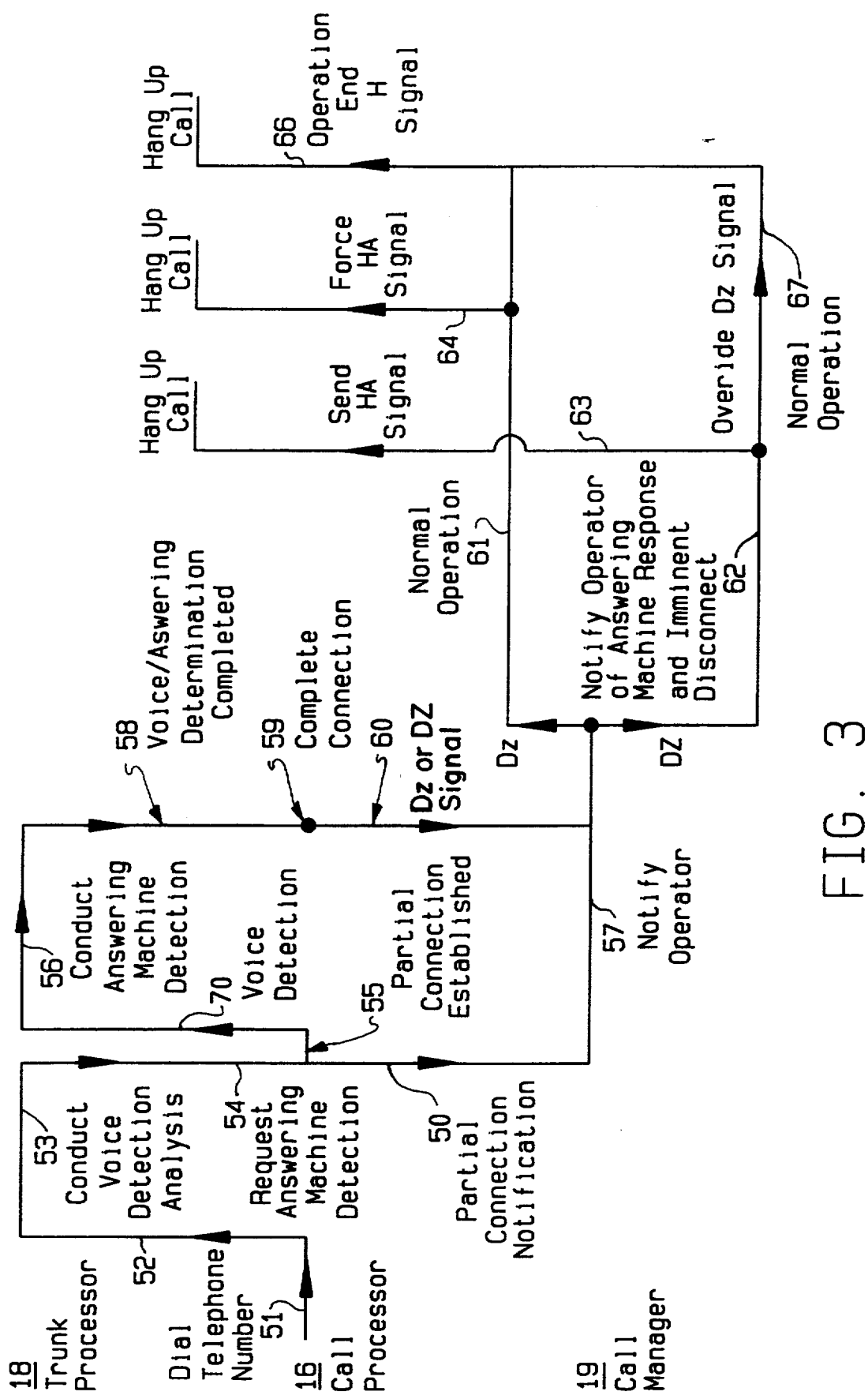
FIG. 3 is an activity versus time chart for certain hardware components of the calling system of FIG. 1.

FIG. 2b is a flow chart of a software program used by the calling system 10 formatted with the selection of the option of detecting and responding to an answering machine 15 at a subscriber location and FIG. 3 shows the operation of the components of the calling system 10 after the selection of the answering machine detection option. The calling system operates to place a call and to detect voice in the same manner as previously described. See 51, 52, and 53 on FIG. 3. If it is then determined that the response from the telephone set 14a is voice, the analysis circuitry of the trunk processor 18 sends a "voice detect" signal to the call processor 16 which orders the detection circuitry of the trunk processor 18 to monitor for "voice silence" on the active trunk 16a (and from the connected telephone set 14a). See line segment 54 and 70 on FIG. 3. After a predetermined period, for example, three seconds, the analysis circuitry of the trunk processor 18 makes a determination of whether the response is a live voice or the answering machine 15. See line segment 56 on FIG. 3. If silence is detected of sufficient duration, e.g., 700 milliseconds, then the call is determined to be a live voice. This duration represents the pause that most people make after answering a telephone call to allow the calling party to respond. It should be noted that although pauses are perceived after each and every spoken word, whether from a live voice or an answering machine, these pauses do not actually exist. The pauses are a result of the cognitive effect of the mental processing of voice that groups syllables into words with pauses in between. It should also be noted that, in an ISDN environment, the trunk processor 18 may make the live voice/answering machine determination by relying on the receipt of certain control information rather than the monitoring of "voice silence".

Pending the live voice/answering machine determination from the trunk processor 18, the call processor 16 connects the output of the active trunk 16a to the next available operator station 20 in the station queue without connecting back the output of the particular operator station 20 (see 55 on FIG. 3). The call processor 16 notifies the call manager 19, which then notifies the operator via a data terminal 20b message, of this partial connection to the active trunk 16a, i.e., that an outgoing call has been answered and is currently being analyzed for detection of an answering machine 15. See line segments 50 and 70 on FIG. 3. At this time, audio communication is partially established on the voice path between voice terminal 20a and the subscriber set 14a to the extent that the operator can listen to the active trunk 16a (and the connected telephone set 14a). Such partial communication is also referred to as one-way audio communication or partial operable connection. This enables the operator to exercise any option to override the system 10 operation if warranted by the circumstances (e.g., an unusual response from a subscriber). Thus, for example, at this time the operator is also given an override option to issue an "OV" command via the call manager 19 which instructs the call processor 16 to complete the station side of the connection and ignore further determinations from the trunk processor 18. The call processor 16 also informs the call manager 19 to notify the operator at the operator station 20. Once the station side of the connection is completed, the operator will then be in control of the active trunk 16a and may continue with normal operation (for example, talk to a subscriber if actually present on the telephone line 11a, verbally leave a message on the answering machine 15, or take information regarding the telephone number from a telephone company intercept message).

Upon completion of the analysis, the trunk processor 18 sends its determination to the call processor 16. See line segment 58 on FIG. 3. Regardless of the signal received from the trunk processor 18, the call processor 16 then completes the station 20 connection (i.e. establishes a complete operable connection, see 59 on FIG. 3) with the active trunk 16a and sends to the call manager 19 either a "DZ" signal which signifies that the answering machine 15 has responded or a "Dz" signal which signifies that a live voice has responded (see line segment 60 on FIG. 3). The call processor 16 takes no further action with respect to that active trunk 16a until it receives further commands from the call manager 19. Note that upon receipt of an "OV" command from the operator station 20 no action is taken by the call processor 16 in response to the determination by the trunk processor 18.

Upon receipt of a "Dz" signal, the call manager 19 notifies the operator station 20, which in turn notifies the operator, that a live voice has responded and that the operator now has control of the active trunk 16a and may continue with normal operation. See line segment 61 on FIG. 3. Upon receipt of a "DZ" signal, the call manager 19 notifies the operator station 20, which in turn notifies the operator, that an answering machine 15 has responded and that the calling system 10 is about to terminate the call (see line segment 62 on FIG. 3). The call manager 19 waits a predetermined period, for example, two seconds, before sending the special hang-up signal, an "HA" signal, to the call processor 16. See line segment 63 on FIG. 3. The "HA" signal commands the call processor 16 to hang up the telephone line 11a by terminating the connection between the active trunk 16a and the respective telephone line 11a and to re-queue the operator station 20 as if there had been no call. The waiting time of the station 20, accumulating from the start of the station's initial time in the queue, is stored by the call processor 16 so that it can be retrieved and the station 20 re-positioned to its original place in the operator station queue. During the wait by the call manager 19, the operator at the operator station 20 has the option to override the sending of any "HA" signal and to issue instead a "Do" command to the call manager 19 which then instructs the call manager 19 to treat the station 20 as if a "Dz" signal had been received instead (see line segment 67 on FIG. 3). This, for example, enables an operator to prevent the generation of an unnecessary nuisance call to a subscriber when the call is answered by a subscriber with an unusually long response.

Upon completion of the particular operation, the operator then sends a command, via the data terminal 20b, to the call manager 19 to send a hang-up signal, an "H" signal, to the call processor 16 to hang up the telephone line 11a by terminating the connection between the active trunk 16a and the respective telephone line 11a and to place the operator station 20 at the end of the station queue (see line segment 66 on FIG. 3).

Regardless whether or not the answering machine detection option is selected, the operator may be given the option to force the sending of the special hang-up signal, an "HA" signal, to the call processor 16 at any time and, thus, restore the operator station 20 to its original position in the operator station queue. See line segment 64 on FIG. 4. This option may be made available for a only limited time period, e.g., five seconds, after a call is connected to prevent eager operators from "jumping" the queue if a subscriber conversation is ended too quickly. In addition, the calling system 10 may be formatted so that the operator, with the use of the operator station 20, can manually report the incident of an answering machine response. This option would be available when the answering machine detection option was not selected and when an operator overrides the system 10 and takes control of the active trunk 16a.

The calling system 10 may also be formatted so that upon the detection of an answering machine 15 response, the system 10 can can have an option to deliver a prerecorded message to the answering machine 15 rather than hanging up the telephone line 11a. After receiving the "HA" signal, the call processor 16 does not disconnect the active trunk 16a from the respective telephone line 11a but does disconnect the active trunk 16a from the station 20 so as to free the operator station 20 (i.e., return the station 20 to the operator station queue) without hanging up the connected telephone line 11a. The call processor 16 also sends a signal to the detection circuitry of the trunk processor 18 to monitor for a significant pause (of a predetermined period), a beep tone on the active trunk 16a, or another type of signal which would indicate that the answering machine 15 was entering its record mode. Upon its determination of the answering machine record mode, the trunk processor 18 signals the call processor 16 to queue the output of the active trunk 16a to the appropriate message announcer 17 which thereupon delivers a prerecorded message. After the message is delivered, the call processor 16 then terminates the call by disconnecting the active trunk 16a from the respective telephone line 11a. The particular message announcer 17 (and associated message) to be connected is set up during the initial formatting of the system 10 or any subsequent changes thereto.

As stated previously, the formatting of the system 10 also includes the establishment of the operational queue for the operator stations 20, 22, 24. The operational queue makes each station 20, 22, 24 available, in respective turn, to be operably connected to a respective subscriber telephone set. The queue can be controlled by scheduling software that paces the dialing rate of the call processor 16 to meet the supply of available operator stations 20, 22, 24. Such scheduling software can utilize an accelerator parameter that promotes a specified average rate of call connections for a respective station and a throttle parameter that establishes a tolerable amount of unsuccessful call connections by a respective station. The former parameter can be, for example, a reference time period between calls received by a respective station (e.g., as measured from the time of a hang-up of a first call to the pick-up of the succeeding call). The latter parameter can be, for example, a count of the connected calls that do not result in an operator conversation with a subscriber, such as dropped calls (i.e., abandoned or unanswered by an operator); telephone tones that are passed through to an operator; or calls responded by an answering machine 15, in proportion to the amount of successful calls connected. Note that the throttle parameter includes an answering machine response as an unsuccessful call connection otherwise the large amount of time in handling such a response would lower the average rate of call connections for a respective station and, thus, slow the dialing rate for the station and the entire system 10.

The system 10 may also be configured to monitor and detect answering machine responses before the determination of a voice response by the trunk processor 18. For example, the detection circuitry of the trunk processor 18 may include means for monitoring the quality of the response from the telephone set 14a and determining therefrom whether an answering machine 15 delivered the response. In particular, upon the call processor's command to monitor for a pick-up and to determine whether a voice response exists, the detection circuitry may also monitor for a characteristic signature, over a short period of time, on the active trunk 16a indicative of an answering machine response (e.g., a noise having a characteristic increasing amplitude and frequency). This is possible since most presently available answering machines employ mechanical tape drive systems and the action of ramping the drive speed can cause a characteristic signature which is transmitted onto the active trunk 16a. The trunk processor 18 will consequently detect the answering machine 15 prior to the detection of voice. Upon notification from the trunk processor 18, the call processor 16 can then terminate the call or take any other appropriate action depending upon the formatting and the application. The means for monitoring element, and the accompanying detection methodology, can be incorporated into the system 10 as a supplement to the previously described detection elements and methodology and can operate whether or not the system 10 is formatted with the selection of the option of detecting and responding to an answering machine. In addition, the means for monitoring element, and the accompanying detection methodology, can be incorporated into the system 10 as an alternative to the previously described detection elements and methodology during the system formatting.

The embodiments described herein are merely illustrative of the principles of the present invention. Various modifications may be made thereto by persons ordinarily skilled in the art, without departing from the scope or spirit of the invention. For example, the call processor 16 can order a complete connection between the active trunk 16a and the operator station 20, rather than a partial connection, upon the receipt of the "voice detect" signal from the trunk processor 18 and while the trunk processor 18 is making its live voice/answering machine determination.

Further, each component of the calling system 10 may be scaled as required by the application and, thus, can be constructed as a discrete component, as an individual integrated circuit board, or as a segment of a single integrated circuit board. Further, each component may be located at different physical locations than any or each of the other components. Further, in many applications users will have existing systems that perform the function of a certain component, such as the calling manager 19 or the operator stations 20, 22, 24, so that the calling system 10 may be composed of existing components of a user and newly installed components.

What is claimed is:

1. An automated telephone calling system comprising:
 a. means for placing a call to a telephone at subscriber's telephone station and receiving a response thereto;
 b. means for characterizing the response to the placed call, received by the means for placing, from the subscriber's telephone station so as to detect a voice signal;
 c. means for determining whether the response characterized as the voice signal is of such character as to suggest being delivered by an answering machine or a live voice;
 d. means for establishing communication between the calling system and the subscriber's telephone station;
 e. means for terminating the communication after the determination by the means for determining that the response is of such character as to suggest being delivered by an answering machine; and
 f. means for providing an operator of the calling system with an option of overriding the operation of the means for terminating so as not to terminate the communication established between the calling system and the subscriber's telephone station.

2. The calling system of claim 1 wherein the means for characterizing comprises:
 a. means for detecting a particular polarity change of the voltage of the response signal over a selected interval;
 b. means for measuring the wavelength of each waveform composing the response signal between each polarity change detected;
 c. means for counting the number of waveforms composing the response signal within each of a plurality of predetermined wavelength groupings; and
 d. means for processing the frequency-related information of the response signal from the means for detecting, the means for measuring, and the means for counting to determine the characterization of the response.

3. The calling system of claim 1 wherein the means for establishing communication comprises:
 a. means for establishing a one-way communication between the calling system and the subscriber's telephone station upon the characterization, by the means for characterizing, of the response as a voice signal; and
 b. means for establishing a one-way communication between the calling system and the subscriber's telephone station upon the determination by the means for determining whether the response is of such character as to suggest being delivered by an answering machine or a live voice.

4. The calling system of claim 1 wherein the means for establishing communication between the calling system and the subscriber's telephone station comprises means for establishing two-way audio communication between the system and the subscriber's telephone station.

5. The calling system of claim 1 further comprising means for forcing a two-way communication between the calling system and the subscriber's telephone station before the determination by the means for determining whether the response is of such character as to suggest being delivered by an answering machine or a live voice and rejecting the determination so as to maintain the two-way communication between the calling system and the subscriber's telephone station regardless the result of the determination.

6. The calling system of claim 1 wherein the means for determining comprises means for detecting a predetermined period of silence in the voice signal of the response from the subscriber's telephone station.

7. The calling system of claim 6 wherein the predetermined period of silence is less than seven hundred milliseconds.

8. The calling system of claim 1 wherein the means for terminating comprises means for delivering a prerecorded message to the subscriber's telephone station before terminating the communication.

9. The calling system of claim 1 further comprising:
 a. means for monitoring the quality of the response, received by the means for placing, and determining therefrom whether the response is of such character as to suggest being delivered by an answering machine; and
 b. means for terminating the placed call upon a determination by said means for monitoring that the quality of the response indicates the response is of such character as to suggest being delivered by an answering machine.

10. An automated telephone calling system comprising:
 a. at least one communication line that enables the system to place a call to a subscriber's telephone station, to receive the response thereto, and exchange information therebetween;
 b. a call processor that places the call, via such communication line, to the subscriber's telephone station and operably connects and disconnects the calling system to the subscriber's telephone station;
 c. a trunk processor that includes means for determining whether the response, on such communication line, from the subscriber's telephone station to the placed call is of such character as to suggest being delivered by an answering machine or a live voice; and
 d. at least one operator station that enables an operator of the calling system to communicate, via such communication line, with the subscriber's telephone station upon an operable connection of the calling system to the subscriber's telephone station, said call processor operably connecting the calling system to the subscriber's telephone station and disconnecting the calling system from the subscriber's telephone station after the determination, by the trunk processor, that the response is of such character as to suggest being delivered by an answering machine; and wherein the at least one operator station comprises means for overriding the operation of the call processor in disconnecting the calling system so as to maintain an operable connection of the calling system to the subscriber's telephone station regardless of the determination that the response was delivered by an answering machine.

11. The calling system of claim 10 wherein the trunk processor further includes means for characterizing the response received from the subscriber's station so as to detect a voice signal; and wherein the call processor establishes a one-way communication between the calling system and the subscriber's telephone station upon the characterization by the trunk processor of the response as a voice signal and thereafter establishes a two-way communication between the calling system and the subscriber's telephone station upon the determination by the trunk processor whether the response is of such character as to suggest being a live voice or delivered by an answering machine.

12. The calling system of claim 11 wherein the at least one operator station comprises means for completing an operable connection of the calling system to the subscriber's telephone station upon demand of the operator, disregarding the determination by the trunk processor whether the response is of such character as to suggest being delivered by an answering machine or a live voice so as to maintain the operable connection of the calling system to the subscriber's telephone station.

13. The calling system of claim 10 wherein two-way audio communication of the at least one operator station to the subscriber's telephone station is established upon operably connecting the calling system to the subscriber's telephone station.

14. The calling system of claim 10 wherein the trunk processor comprises means for detecting a predetermined period of silence in the response from the subscriber's telephone station in order to determine whether a response is of such character as to suggest being live voice or delivered by an answering machine.

15. The calling system of claim 14 wherein the predetermined period of silence is less than seven hundred milliseconds.

16. The calling system of claim 10 further comprising a message announcer that delivers a prerecorded message, via such communication line, to the subscriber's telephone station before the call processor disconnects the calling system from the subscriber's telephone station, after a determination, by the trunk processor, that the response is of such character as to suggest being delivered by an answering machine.

17. An automated telephone calling system comprising:
 a. a plurality of communication lines, which enable the system to place calls to telephone stations of telephone subscribers and to receive the responses thereto;
 b. a plurality of operator stations, each of which enables an operator of the calling system to communicate, via one of the communication lines, with one of the telephone stations of telephone subscribers upon an operable connection being established between one of the the telephone stations and one of the operator station;
 c. a call processor that places calls, via the plurality of communication lines, to the telephone stations and operably connects and disconnects the telephone stations and the operator stations;
 d. a trunk processor that determines whether each of the responses from the telephone stations to the placed calls is of such character as to suggest being delivered by an answering machine or live voice; and
 e. a call manager that controls the availability of each of the operator stations to be operably connected to one of the telephone stations, said call processor operably connecting the telephone stations to the operator stations, made available by the call manager, and disconnecting the telephone stations from the operator stations for which the trunk processor determined that the response are of such character as to suggest being delivered by an answering machines;

wherein each of the operator stations comprises means for providing an operator with an option of overriding the operation of the call processor in disconnecting an operator station upon the determination by the trunk processor that a response from an operator of such character as to suggest being delivered by an answering machine, so as not to disconnect an operable connection between such operator station and the telephone station.

18. The calling system of claim 17 wherein the call processor establishes the operable connections to the telephone stations by first establishing one-way audio communication between operator stations and telephone stations to permit operators to listen to response from the telephone stations and thereafter establishing two-way audio communication between the operator stations and the telephone stations.

19. The calling system of claim 17 wherein each of the operator stations comprises means for establishing and maintaining a two-way communication between a telephone station and an operator station upon a request of an operator of the telephone station to disregard the determination by the trunk processor whether the response is of such character as to suggest being delivered by an answering machine.

20. The calling system of claim 17 wherein the trunk processor monitors for a predetermined period of silence in a response from the subscriber's telephone station in order to determine whether the response is of such character as to suggest being delivered by an answering machine or live voice.

21. The calling system of claim 20 wherein the predetermined period of silence is less than seven hundred milliseconds.

22. The calling system of claim 17 further comprising at least one message announcer, such message announcer delivers a prerecorded message, via one of the communication lines, to a telephone station before the call processor terminates a communication with the telephone station, after a determination, by the trunk processor, that a response from the telephone station is of such character as to suggest being delivered by an answering machine.

23. A communications system comprising:
   a. means for placing a call to a subscriber's telephone station and receiving a response thereto;
   b. means for characterizing the response signal from the subscriber's telephone station as voice signal, silence, or telephone tone;
   c. means for establishing communications between the system and the subscriber's telephone station upon a characterization, by the means for characterizing, of the response signal as a predetermined type of signal;
   d. means for determining whether the response signal characterized as a predetermined type of signal is of such character as to suggest being delivered by an answering machine;
   e. means for terminating the communication between the system and the subscriber's telephone station after the determination by the means for determining that the response signal is of such character as to suggest being delivered by an answering machine; and
   f. means for providing an option to override the operation of the means for terminating so as not to terminate the communication between the calling system and the subscriber's telephone station regardless of the determination of the means for determining.

24. A method of handling a response from a telephone subscriber's telephone station to a placed call from an automated telephone calling system, comprising the steps of:
   a. placing the call to the subscriber's telephone station;
   b. receiving the response to the placed call;
   c. characterizing the response from the subscriber's telephone station to the placed call so as to detect a voice signal;
   e. establishing communication between the calling system and the subscriber's telephone station upon a characterization of the response as a voice signal;
   f. determining whether the response characterized as a voice signal is of such character as to suggest being delivered by an answering machine; and
   g. terminating the communication after the determination that the response is of such character as to suggest being delivered by an answering machine.
   h. overriding the termination of the communication, so as not to perform the step (g), in response to the instruction by an operator of the calling system.

25. A communications system having a plurality of operator stations, which enable operators of the system to communicate and exchange information with telephone subscribers using telephone stations, comprising;
   a. means for representing the plurality of operator stations as arranged in an operational queue so that each operator station is made available, in respective turn, to be operably connected to one of the telephone stations;
   b. means for operably connecting a next operator station of the plurality of operator stations which has been made available in the operational queue to one of the telephone stations;
   c. means for terminating the operable connection between the next operator station and one of the telephone stations, to which the next operator station is connected, at the end of a communication between the next operator station and one of the operator stations and placing said next operator station at the end position of the operational queue; and
   d. means for terminating the operable connection between the next operator station and one of the telephone stations, to which the next operator station is connected, in response to a predetermined condition before the end of the communication and placing said next operator station at the position in the operational queue occupied by said next operator station before the operable connection to the telephone station.

26. The system of claim 25 further comprising:
means for determining whether a response from a telephone station is of such character as to suggest being delivered by an answering machine;
wherein the determination whether the response is of such character as to suggest being provided by an answering machine is employed as the predetermined condition for automatically terminating the operable connection between the next operator station and one of the telephone stations before the end of the communication and placing said next operator station at the position in the operational queue occupied by said next operator station before the operable connection to one of the telephone stations.

27. The system of claim 25 wherein the means for terminating the operable connection with the telephone station in response to a predetermined condition comprises means for terminating the operable connection within a predetermined period after the operable connection between said operator station and said telephone station has been established.

28. The system of claim 25 further comprising means for overriding the means for terminating the operable connection between the next operator station and the telephone station before the end of a communication and continuing the communication between said operator and the telephone station regardless of the predetermined condition.

29. The system of claim 25 further comprising means for delivering a prerecorded message to the telephone station before the termination of the operable connection by the means for terminating in response to a predetermined condition.

30. The system of claim 25 further comprising means for establishing a predetermined rate of operable connections for the operator stations.

31. The system of claim 30 wherein the means for establishing predetermined rate comprises means for establishing a reference time period between successive operable connections of the operator stations as measured from the time of a hang-up of a first operable connection by an operator station to the pick-up of a succeeding operable connection by the operator station.

32. A communication system comprising:
a. means for sending a signal to a subscriber's communications station and receiving a response signal thereto;
b. means for characterizing the response signal;
c. means for operably connecting the system to the station upon a characterization of the response signal as predetermined type of signal;
d. means for monitoring the quality of the response signal characterized as a predetermined type of signal and determining therefrom whether the response signal is of such character as to suggest being delivered by an answering machine;
e. means for terminating the operable connection of the system to the subscriber's station upon a determination that the response signal is of such character as to suggest being delivered by an answering machine; and
f. means for providing an option of overriding the operation of the means for terminating so as not to terminate the operable connection of the communication system to the subscriber's communication station.

33. A calling system comprising:
a. means for placing a call to a called side and receiving a response thereto;
b. means for establishing communication between an operator of the system at an operator station and the called side;
c. means for determining whether the response from the called side is of such character as to suggest being provided by an answering machine or live voice;
d. means for terminating the communication between the called side and the operator if the response is of such as to suggest being provided by an answering machine; and
e. means for overriding the termination of the communication in response to a command from the operator, so as not to terminate the established communication between the operator and the called side regardless of the determination that the response is of such character as to suggest being delivered by an answering machine.

34. The system of claim 33 further comprises means for detecting a voice in the response from the called side.

35. The system of claim 34 wherein the communication of established upon the detection of the voice signal, by the means for detecting.

36. The calling system of claim 34 wherein a partial, one-way, audio communication is established upon the detection of the voice signal and a complete, two-way, audio communication between the operator and the called side is established upon the determination whether the response is of such character as to suggest being delivered by the answering machine or live voice.

37. The calling system of claim 33 wherein a complete, two-way audio communication between the operator and the call side is established upon the determination whether the response is of such character as to suggest being delivered by an answering machine or live voice.

38. The calling system of claim 37 further comprising means for establishing a complete, two-way, audio communication between the operator and the called side in response to a command from the operator issued prior to the determination by the means for determining whether the response is of such character as to suggest being provided by an answering machine or live voice.

39. The calling system of claim 33 wherein the means for determining whether the response is of such character as to suggest being provided by an answering machine or live voice comprises means for detecting a predetermined period of silence in the response from the called side.

40. The calling system of claim 39 wherein the predetermined period of silence is less than seven hundred milliseconds.

41. The calling system of claim 33 wherein the means for terminating comprises means for delivering a prerecorded message to the called side before terminating the communication.

42. The calling system of claim 33 wherein the means for placing comprises a call processor that places the call to the called side.

43. The calling system of claim 42 wherein the means for determining comprises a trunk processor.

44. The calling system of claim 33 further comprising an operational queue, having a front and a back, that represents operators of the system awaiting the establishment of the communication with called sides; wherein the representations of the operators are arranged in the queue in the sequence in which the operators are connected to communicate with the called sides; and wherein, at any given time, an operator at the front of the queue is the first operator to be connected for the communication with a called side and the operator at the back of the queue is the last one to be provided with the communication to a called sides.

45. The calling system of claim 44 wherein after a particular operator, communicating with a called side, terminates the communication by hanging up, the representation of the particular operator is placed at the back of the operational queue.

46. The system of claim 44 wherein if the communication of a particular operator with a called side has been terminated because the response from the called side has been delivered by an answering machine the representation of the particular operator is placed at the front of the operational queue.

47. A method, for providing communication between operators of a calling system and called sides comprising:
   a. placing a call to a called side and receiving a response thereto;
   b. establishing communication between an operator of the system at an operator station and the called side;
   c. determining whether the response from the called side is of such character as to suggest being provided by an answering machine or live voice;
   d. terminating the communication between the called side and the operator if the response is of such character as to suggest being provided by an answering machine unless an operator selects an option to maintain the communication.

48. The method of claim 47 further comprises detecting a voice signal in the response from the called side.

49. The method of claim 48 wherein the communication is established upon the detection of the voice signal.

50. The method of claim 48 further comprises establishing partial, one-way, audio communication, that permits the operator to listen to the output from the telephone of the called side, upon the detection of the voice signal and establishing a complete, two-way, audio communication between the operator and the called side upon the determination whether the response is of such character as to suggest being delivered by the answering machine or live voice.

51. The method of claim 47 wherein a complete, two-way, audio communication between the operator and the called side is established after the determination whether the response is of such character as to suggest being delivered by the answering machine or live voice.

52. The method of claim 47 further comprising establishing a complete, two-way, audio communication between the operator and the called side in response to a command from the operator issued prior to the determination whether the response is of such character as to suggest being or provided by an answering machine or live voice.

53. The method of claim 47 wherein the step of determining whether the response is of such character as to suggest being provided by an answering machine or live voice comprises a step of detecting a predetermined period of silence in the response from the called side.

54. The method of claim 47 wherein the step of terminating comprises means for delivering a prerecorded message to the called side before terminating the communication.

55. The method of claim 47 further comprising a step of establishing an operational queue, having a front and a back, that represents the operators awaiting the establishment of the communication with the called sides; wherein the representations of the operators are arranged in the queue in the sequence in which the operators are connected to communicate with the called sides; wherein, at any given time, such operator at the front of the queue is next operator to be connected for the communication with a called side and such operator at the back of the queue is last one to be provided with the communication to the called side.

56. The calling system of claim 55 further comprising placing a representation of a particular operator at the back of the operational queue after the particular operator, communicating with the called side, terminates the communication by hanging up.

57. The system of claim 55 further comprises placing a representation of a particular operator at the front of the operational queue so as to be connected to the next available called side if communication of the particular operator with the called side has been terminated because the response from the called side has been delivered by an answering machine.

* * * * *